United States Patent
Dybdal et al.

(10) Patent No.: US 7,518,551 B2
(45) Date of Patent: Apr. 14, 2009

(54) METHODS AND SYSTEMS FOR TRACKING SIGNALS WITH DIVERSE POLARIZATION PROPERTIES

(75) Inventors: Robert B. Dybdal, Palos Verdes Estates, CA (US); Denny D. Pidhayny, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 11/772,086

(22) Filed: Jun. 29, 2007

(65) Prior Publication Data

US 2008/0012763 A1 Jan. 17, 2008

Related U.S. Application Data

(62) Division of application No. 10/807,587, filed on Mar. 22, 2004, now Pat. No. 7,239,275.

(51) Int. Cl.
*H04B 7/10* (2006.01)
*G01S 13/00* (2006.01)

(52) U.S. Cl. .............. 342/362; 342/159; 455/276.1

(58) Field of Classification Search ............ 342/80, 342/149, 159, 362–364; 455/295–296
See application file for complete search history.

(56) References Cited

U.S. PATENT DOCUMENTS

| | | | | |
|---|---|---|---|---|
| 3,273,158 A | * | 9/1966 | Fouts et al. | 343/792 |
| 4,283,795 A | | 8/1981 | Steinberger | |
| 4,606,054 A | | 8/1986 | Amitay et al. | |
| 4,723,321 A | * | 2/1988 | Saleh | 455/295 |
| 5,025,493 A | * | 6/1991 | Cook, Jr. | 342/374 |
| 5,027,124 A | * | 6/1991 | Fitzsimmons et al. | 342/362 |
| 6,771,214 B2 | | 8/2004 | Kober et al. | |
| 2002/0061752 A1 | * | 5/2002 | Kurokami | 455/447 |
| 2003/0092456 A1 | * | 5/2003 | Dent | 455/503 |
| 2003/0162566 A1 | * | 8/2003 | Shapira et al. | 455/561 |

OTHER PUBLICATIONS

R. B. Dybdal, "Polarization Efficiency Statistics," *1999 IEEE MILCOM Symposium Digest*, Atlantic City NJ, pp. 203-207, Nov. 1-3, 1999.

R. B. Dybdal and D. D. Pidhayny, "Evaluation of Antenna Tracking Systems," *2001 AMTA Symposium Digest*, Denver CO, pp. 139-143, Oct. 21-26, 2001.

(Continued)

*Primary Examiner*—Isam Alsomiri
(74) *Attorney, Agent, or Firm*—Henricks, Slavin & Holmes LLP

(57) ABSTRACT

Methods and systems for tracking signals with diverse polarization properties address both sensitivity and antenna tracking performance issues. In one embodiment, complex weightings for matching a polarization of an incident signal on a data channel are determined, and the complex weightings are applied to a tracking channel such that an antenna system polarization is matched to the polarization of the incident signal. In another embodiment, orthogonally polarized tracking channel components of an incident signal are processed to make a determination as to which of the orthogonally polarized tracking channel components is stronger, and this determination is used to select a polarization of a data channel to reduce a polarization mismatch loss.

2 Claims, 5 Drawing Sheets

OTHER PUBLICATIONS

S. Miller and J. Shapira, "Transmission Considerations for Polarization-Smart Antennas," Celletra Ltd., Yokne'am, Israel, downloaded Jun. 12, 2003, http://www.cdg.org/resources/white_papers/files/SmartAntennasPaper820VTC01.pdf.

R. B. Dybdal and D. D. Pidhayny, "Polarization Optimization for Tracking Antennas," *2003 IEEE AP-S Symposium Digest*, Columbus OH, Jun. 22-27, 2003.

* cited by examiner

METHODS AND SYSTEMS FOR TRACKING SIGNALS WITH DIVERSE POLARIZATION PROPERTIES

CROSS-REFERENCE TO RELATED APPLICATIONS

This application is a divisional of U.S. patent application Ser. No. 10/807,587 entitled "Methods and Systems for Tracking Signals with Diverse Polarization Properties" filed on Mar. 22, 2004 now U.S Pat. No. 7,239,275.

STATEMENT OF GOVERNMENT INTEREST

The invention was made with Government support under National Oceanic & Atmospheric Administration (NOAA) Contract 50-SPNA-0-00012. The Government has certain rights in the invention.

BACKGROUND OF THE INVENTION

Radio frequency signals received by antennas have polarization properties that characterize the orientation of the incident electric fields. Communication systems antennas are generally designed to receive radio frequency signals having a specified polarization. However, in practice, incident fields matching the design polarization for a given antenna are not always received. If the polarization of the incident field approximates the polarization of the antenna, most of the signal power is received by the antenna, and the difference between the ideal and actual polarization is characterized by "polarization loss."

When such communication systems require narrow beamwidth antennas for signal reception, the antennas must be accurately pointed at the received signal source to receive the maximum signal power. High gain antennas having a narrow beamwidth commonly use monopulse designs that can align the position of the antenna with the signal to receive the maximum available power; the deviation between ideal and actual antenna pointing is referred to as "pointing loss."

Closed loop monopulse tracking systems operate by processing two types of antenna patterns. The first is a sum pattern that has its maximum gain when aligned with the signal and is used for data reception. The second is a difference pattern where a pattern null exists on the axis of the sum beam. The ratio of the difference and sum beams has a linear variation for deviations from the antenna axis, and this linear deviation is used to configure a control system that automatically maintains antenna alignment with the signal as the relative positions of the antenna and signal direction vary.

In operation, the antenna control system treats the difference beam output as an error signal. Minimizing this error signal aligns the null of the difference pattern with the signal direction. By design, the peak of the sum beam for the data reception is coincident with the null of the difference beam. Thus, the antenna alignment with the null of the difference beam also aligns the peak of the sum beam used for data reception. Because the control system continuously monitors the error signal, the antenna follows the movement in the signal direction. These sum and difference patterns are commonly obtained by two different antenna feed designs. One design surrounds the central feed horn for data reception with smaller tracking elements that are sampled for the difference beam. Another design is a multi-mode horn where the dominant mode provides the sum beam and higher order modes provide the difference beam.

While such antenna tracking techniques perform very well when the incident signals have the design polarization characteristics, performance degrades when the incident polarization is cross-polarized with the design polarization. By way of example, for telemetry antennas on spacecraft, cross-polarized signals can result from antenna interactions with the surrounding spacecraft. Also by way of example, for ground tracking stations supporting launch operations, cross polarization can result from interactions with the launch vehicle and plume effects.

The cross polarized signal can result in unstable tracking performance and the antenna failing to track the desired signal. The reason for this loss of tracking lies with the cross-polarized antenna response.

When the antenna receives a cross polarized signal, the difference over sum ratio of the tracking output of the antenna no longer has the desired linear variation as the antenna position deviates from the antenna beam axis. Thus, the control system for antenna pointing does not have the assumed linear variation with antenna displacements from the axis. Instead of the desired linear deviation of the error signal as the antenna moves from its desired axial position, the cross polarized response has a peak value on axis, the "zero error condition" is double valued at positions displaced from the axis, and the slope of the response is opposite the desired slope driving the antenna away from axis.

FIG. 6 shows a difference pattern for an example principal polarization response. As shown, the zero error condition occurs on-axis with positive and negative excursions as the antenna deviated from axis. Measured data also presents a well-behaved angular step response; likewise the angular ramp response which scans the antenna back and forth about the axis follows the linear deviation of the difference pattern.

FIG. 7 shows a difference pattern for an example cross polarization response. In contrast with the difference pattern of FIG. 6, the zero error point is not on axis but rather off-axis at a level about 10 dB down from the beam peak. Worse yet, the slope of the difference pattern on the left side is opposite that of the principal polarization and instead of driving the antenna toward the axis drives the antenna away from the axis. This behavior has also been observed in measured data. The step response indicates the unstable behavior of the antenna. The ramp response, unlike that of the principal polarization, does not have any indication of the linear variation on which the control system is predicated. The antenna response during the measurements is basically a coning motion corresponding to the zero error value being at the 10 dB below beam peak level and the instability is exhibited in both the azimuth and elevation channels. In operation, as the antenna continues to search, it encounters the wrong slope and drives the antenna away from the signal. Thus, the antenna response is unstable when tracking the cross polarized signal.

For the data channel, diversity-combining techniques exist to maximize the received signal level. And for the tracking, two orthogonally polarized signals can be used with independent tracking receivers. Such an approach, however, requires the selection of the appropriate signal polarization and since either orthogonal polarization is not matched to the incident signal, loss of signal power occurs.

In summary, tracking performance is degraded by polarization mismatch loss, and antenna tracking can become very unstable when the received signal is predominately cross-polarized. Conventional antenna control systems expect an output from the tracking (difference) beam that linearly increases in amplitude with deviations from the boresight axis of the antenna. This linear increase in amplitude with deviation from the boresight axis is the pattern behavior in the null of the difference beam. Cross-polarized signals do not have this expected linear response resulting in unstable tracking behavior.

Two problems therefore are faced when the received signals have mixed and time-varying polarization properties. The first problem is the signal reduction that results from polarization mismatch, which in turn, results in a reduction in system sensitivity. The second problem is the degradation in antenna tracking performance and possible loss of antenna tracking resulting from the unstable behavior. It would be desirable to be able to provide a method that avoids or lessens this unstable operation and results in antenna tracking that is insensitive to the polarization of received signals.

BRIEF DESCRIPTION OF THE DRAWINGS

Detailed description of embodiments of the invention will be made with reference to the accompanying drawings.

DETAILED DESCRIPTION

The following is a detailed description for carrying out the invention. This description is not to be taken in a limiting sense, but is made merely for the purpose of illustrating the general principles of the invention.

Figure 1:
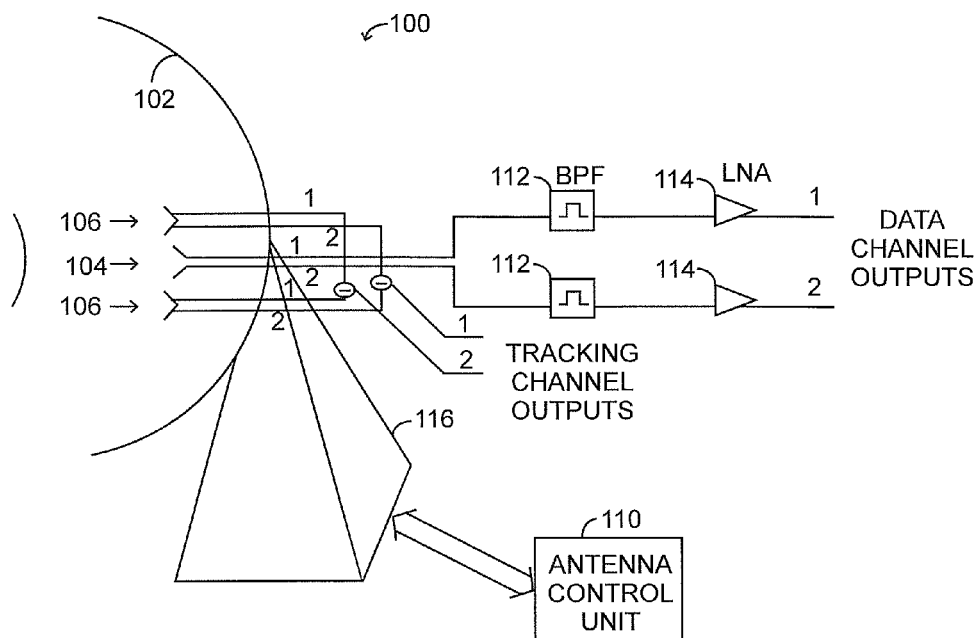
FIG. 1 shows an antenna system according to an example embodiment of the present invention.

The present invention generally involves methods and systems for tracking signals that have diverse polarization properties. Referring to FIG. 1, an antenna system 100 according to an example embodiment of the present invention includes a reflector antenna 102, a central feed 104, tracking feeds 106, an antenna control unit (ACU) 110, band pass filters 112, low noise amplifiers 114 and a positioner 116, configured as shown. The example antenna system 100 has a tracking feed design that is configured to provide orthogonally polarized terminals for both data and tracking channels. A reflector antenna with a Cassegrain configuration, by way of example, provides high gain performance with an associated narrow beamwidth and uses a closed loop tracking system to automatically track the signal of interest. It should be appreciated, however, that antenna systems according to the present invention are not limited to this specific antenna technology.

The tracking feed 106, as shown in this example embodiment, includes the central antenna feed 104 aligned with the axis of the antenna 102 that provides a main beam whose maxima is coincident with the axis of the antenna 102. The central feed 104 is used to receive the data and is associated with the data channel. The central feed 104, as shown in this example embodiment, is surrounded by separate tracking elements, two of which are shown in FIG. 1 and a second pair (not shown), which are orthogonally displaced relative to the pair of tracking elements shown. In an example embodiment, each of these four tracking elements is displaced from the axis of the antenna 102 by the same distance and disposed at quadrature positions surrounding the central horn of the antenna 102. Each tracking element by itself produces a beam that is displaced from the axis. When oppositely opposed elements are subtracted from one another, a resulting beam is produced that has a null or zero value along the axis of the antenna and, to first order, changes linearly with deviations from the axis, positive on one side of the axis and negative on the other side of the axis. The antenna control unit 110 is configured to treat this behavior of the tracking elements as an error signal, and to minimize or control the error to align the antenna 102 with the null on the axis that corresponds to the peak of the data channel pattern. Deviations from this position result in a non-zero error signal and the sign of the deviation indicates which side of the axis is displaced from the signal. This behavior from the tracking channels together provides the control law for the antenna control unit 110 and, for example, by continually monitoring the error response and minimizing its value, provides the antenna system 100 with a mechanism for following changes in the signal direction, or for "tracking" the signal.

This tracking capability can be provided in a variety of different ways. For example, various tracking approaches are embodied in designs that produce a linear deviation with signal displacements from the axis and include a mechanism for determining the direction from the axis. An example implementation for the tracking feed using a central feed that produces the data channel pattern with a dominant mode waveguide distribution and the tracking channel with higher order waveguide modes. By way of example, such an antenna feed implementation has a single horn capable of producing patterns with the dominant mode for the data channel and higher order modes for the tracking channel. As described above, the tracking can be separated in orthogonal planes, e.g., azimuth and elevation, or in a polar rho/theta coordinate system where the amplitude of the error signal and the phase, derived from the phase difference between the data and tracking channels, provide the information of signal misalignment as an input to the antenna control unit.

As shown in FIG. 1, the example antenna system 100 includes orthogonally polarized terminals for both the data and tracking channels. The designations, "1" and "2", on these polarized terminals refer to orthogonally polarized states. For example, the orthogonally polarized states can be right and left handed circular polarization, or vertical and horizontal linear polarization. While referred to as orthogonal polarization states, it should be understood that these polarizations are nominally orthogonal in practical implementations. For example, a system may respond to its design polarization, say right hand, at a level 20 dB (100 times more power sensitivity) higher than that of a signal having the cross polarization, in this example, left hand. A variety of situations result in practice where the signal polarization is modified from its nominal characteristics. One problem is multipath, i.e., scattering from other objects that interferes with the direct path to the signal source. Propagation conditions in the signal path can also modify the polarization; one example is the Faraday rotation of a signal passing obliquely through the ionosphere at lower microwave frequencies. The present invention addresses the polarization diverse situation and, in various embodiments, endeavors to make antenna tracking independent of the incident polarization and thereby avoid the loss of antenna tracking that results when the antenna tracks a cross polarized signal.

As discussed previously with respect to conventional systems, when cross polarized signals are received by the tracking channels, the first problem is that the cross polarized antenna response is significantly lower than the response for the desired principal, or design polarization. Thus, this lower signal level can be limited by the noise level of the system. The second problem is that the response of the tracking channel to this cross-polarized signal does not provide linear variation of the error signal with signal deviations from the axis of the antenna.

Figure 2:
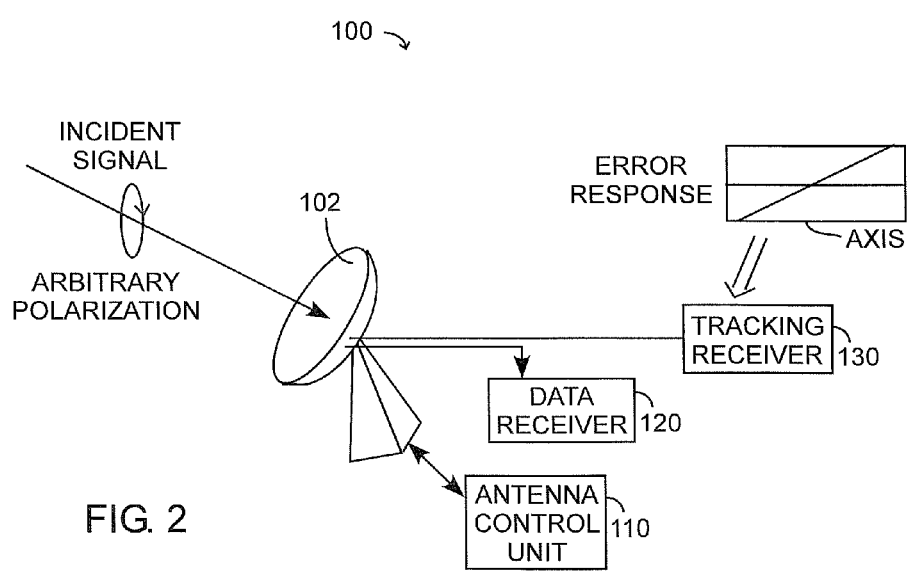
FIG. 2 is a higher-level illustration of the antenna system of FIG. 1.

FIG. 2 is a higher-level illustration of the antenna system 100 of FIG. 1, showing a data receiver 120 and a tracking receiver 130 (not shown in FIG. 1). FIG. 2 also includes an example error signal response for the tracking channels for the principal polarization, a response that to first order is a linear variation with signal deviations from the axis of the antenna. This linear variation persists over a large portion of the main beam of the antenna. The error response for a cross-polarized signal has a decidedly different behavior from the principally polarized signal. The zero values of the error response do not coincide with the antenna axis, and in fact are located where the data channel pattern is about 10 dB (1/100) lower in its response than the peak value on axis. Further, the slopes of the error response are oppositely directed, and thus, drive the antenna in an incorrect and unstable manner away from the signal.

Referring again to FIG. 1, the band pass filters 112 isolate the antenna from interference, and the low noise amplifiers 114 establish a system noise level. The tracking channels can also include filtering and preamplification. The positioner 116 provides a mechanism for following dynamic variations in the signal direction and, under control of the antenna control unit 110, repositions the antenna 102 over an angular range within which the signal may be located. In addition to responding to the error response of the tracking channel, the antenna control unit 110 provides a mechanism for commanding the antenna 102 to specified angular positions as might be used for diagnostics and/or calibration.

Figure 3:
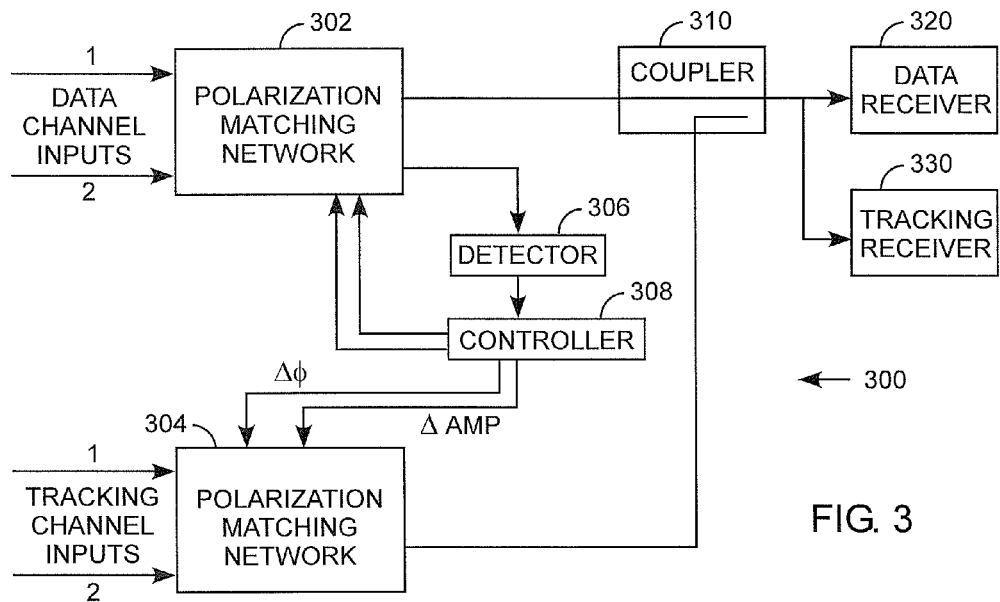
FIG. 3 illustrates antenna system electronics according to an example embodiment of the present invention.

FIG. 3 illustrates antenna system electronics 300 according to an example embodiment of the present invention which are connected to the antenna system 100 (FIG. 1). In various embodiments of the present invention, the electronics 300 are part of the antenna system 100. In this example, the antenna system electronics 300 address the problem of maintaining the data signal power (i.e., polarization mismatch loss) by using a polarization matching network to derive a measurement of the incident polarization and to match the polarization of the incident signal. The antenna system electronics 300 address the problem of unstable antenna tracking with cross polarized signals by commanding combinations of the orthogonally polarized tracking channels to match the polarization of the incident signal. More specifically, this is accomplished by commanding complex weighting of the tracking channels from the weighting derived from the data channel polarization matching. Thus, the tracking channel polarization is matched to the incident polarization and a cross-polarized, unstable tracking response is avoided.

According to various embodiments of the present invention, a polarization matching network is used to minimize (or lessen) polarization mismatch loss, complex weighting values are derived from operation of the polarization matching network, and the complex weighting values and their variation are applied to the tracking channels. In various embodiments, the tracking channels are provided with complex weighting circuitry that can be commanded to replicate the weighting and hence the polarization of the incident signal. By continuously matching the polarization of the incident signal, the problem of tracking on a cross-polarized signal and the associated unstable tracking can be avoided.

Figure 3A:
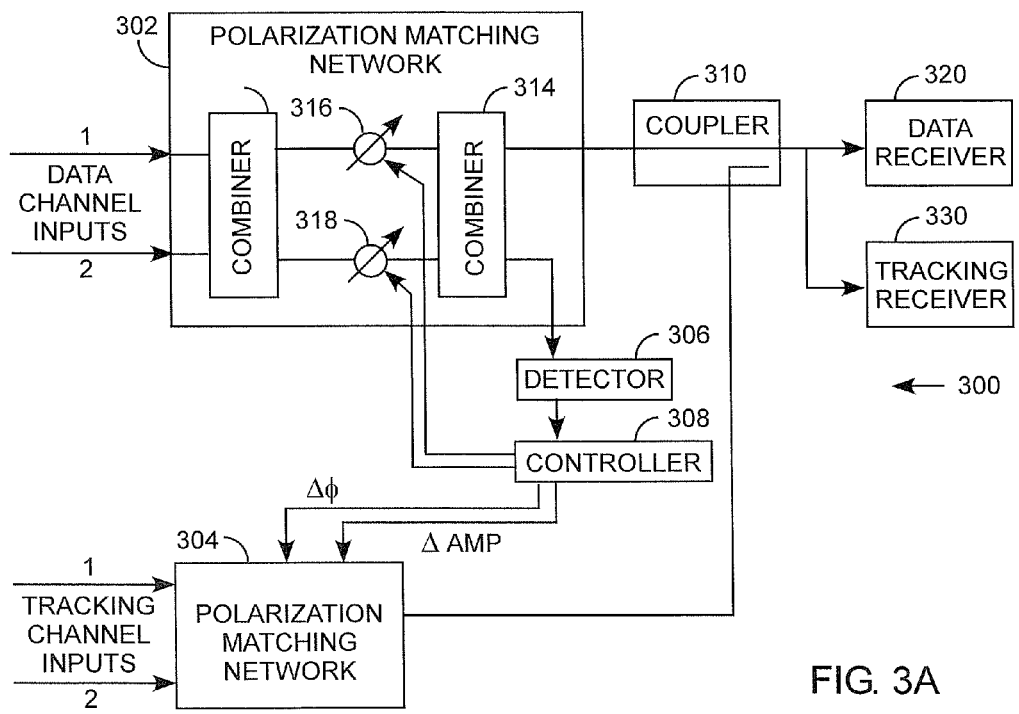
FIG. 3A illustrates the antenna system electronics of FIG. 3A with an example polarization-matching network.

In this example, the antenna system electronics 300 include polarization-matching networks 302 and 304, a detector 306, a controller 308, a coupler 310, a data receiver 320 and a tracking receiver 330, configured as shown. The polarization-matching network 302 and 304 can take various forms including, but not limited to, vector modulators and diversity combiners. By way of example, and referring to FIG. 3A, the polarization matching network 302 can be a vector modulator that includes two (hybrid) combiners 312 and 314 connected with two phase shifters 316 and 318 as shown. Also by way of example, the polarization-matching network 302 can be a commercially available diversity combiner operating after downconversion at an intermediate frequency (IF), rather than the radio frequency (RF) implementation shown in FIG. 3A. The polarization-matching network 304 can take the same or a different form from that of the polarization-matching network 302. In operation, adjustment of the phase shifters 316 and 318 (in response to signals provided by the controller 308) provides any complex sum at the output terminals of the combiner 314. In this example, one of the output terminals is routed to the system receivers (the data receiver 320 and the tracking receiver 330) and the other to the detector 306. In this example, the controller 308 functions to adjust the phase shifters 316 and 318 so that the power received by the detector 306 is minimized.

The problem of polarization mismatch loss is addressed by combining the orthogonally polarized data channels with the polarization-matching network 302. The polarization-matching network 302 is configured to derive an amplitude and phase combination of the orthogonally polarized data channels in such a way that the received signal power is maximized. When the signal level is maximized, the complex sum of the two orthogonal channels minimizes the polarization mismatch loss and consequently, the complex sum of the two orthogonal channels produces an antenna system polarization that is matched to the polarization of the incident signal. By way of example, the polarization-matching network 302 is configured and controlled to continuously monitor the received signal level and automatically respond to changes in the signal polarization. It should be noted, however, that in practice this technique typically provides a polarization match within about 0.5 dB of ideal performance.

In this example embodiment, the polarization-matching network 302 measures the polarization of the incident signal and determines an amplitude and phase combination that matches the polarization of the incident signal. This information is then applied to the tracking channel, in this example, via the detector 306, controller 308 and polarization-matching network 304. In this example, the same vector modulation structure is used for the polarization matching network 304 to match the tracking channel polarization to the incident signal by commanding the values determined in the data channel and responding to the time variation of the polarization of the incident signal.

In communication applications, the signals from the tracking channels are applied to the data channel through the coupler 310, in what is referred to as a pseudo-monopulse technique; the present invention can be applied to other monopulse designs for applications such as radar. The tracking channel injected through the coupler 310 is at a lower level than the data channel. The tracking channels are switched between coordinates, e.g., azimuth and elevation, and the tracking receiver 330 is synchronously switched with the channel switching; switching circuitry (not shown) includes, for example, a monopulse comparator. In other implementations, higher order tracking feed phase shifters are used for the coordinate switching. This switching produces an amplitude modulation on the data channel that is detected by the tracking receiver 330 to obtain the response. The amplitude modulation is superimposed on the data signal by the coupler 310 and consequently is independent of the received signal amplitude.

In this example embodiment, the system is provided with a single tracking receiver thereby eliminating the problem of having to maintain amplitude alignment between two tracking receivers. Amplitude alignment refers to both receivers producing the same indicated output for the same input signal level so that a reliable decision can be made regarding the stronger signal for tracking purposes. The tracking receiver 330 can take a variety of different forms. One type recovers the carrier component of the signal and uses it for deriving tracking information. Other types operate by receiving the entire signal power. Yet another type derives the amplitude modulation of the tracking signal from the automatic gain control (AGC) of the data receiver 320. Thus, polarization matching of the tracking channels in this embodiment maximizes the sensitivity of the tracking receiver 330 and also avoids the problem of unstable antenna tracking when the antenna is cross polarized to the incident signal.

According to an example embodiment of the present invention, a method for antenna tracking includes determining complex weightings for matching a polarization of an incident signal on a data channel, and applying the complex weightings to a tracking channel such that an antenna system polarization is matched to the polarization of the incident signal. According to another example embodiment of the present invention, a method for antenna tracking includes deriving complex weighting values that match a polarization of an incident signal on a data channel, and applying the complex weighting values and time variations of the complex weighting values to a tracking channel to replicate the polarization of the incident signal over time.

According to an example embodiment of the present invention, a system for antenna tracking includes a mechanism for measuring a polarization of an incident signal on a data channel and for determining an amplitude and phase combination that matches the polarization, and a mechanism for applying the amplitude and phase combination to a tracking channel responding to variations in the polarization. Either or both mechanisms can include a polarization-matching network.

According to the present invention, alternative approaches to addressing the problem involve providing a mechanism for making the antenna tracking independent of the polarization of the incident signal. Generally, these approaches include determining the stronger of the two orthogonal polarization components and using this determination to select a polarization of the data channel to reduce the polarization mismatch loss. These alternative embodiments avoid the complexity and expense of providing polarization matching networks for both the data and tracking channels. In contrast to the embodiment described with reference to FIG. 3, the appropriate polarization component is derived from the tracking channel rather than the data channel. However, because the polarization is not matched on both the data and tracking channels, the sensitivities are reduced from the approaches where the polarization is matched Typically, polarization matching can be done within 0.5 dB of ideal performance. When the stronger polarization component is used rather than attempting to ideally match the polarization, the loss in sensitivity is bounded by 3 dB. In some applications, adequate system margin exists and such loss can be tolerated. In other applications, a somewhat larger antenna can be used to offset the polarization loss.

In either case, a less expensive implementation may be more desirable than obtaining maximum sensitivity. A further alternative would be to use polarization matching on only the data channel, and accept the polarization loss on the tracking channel. This alternative may be acceptable in many practical applications because the tracking sensitivity is often much higher because data demodulation is not required and averaging can be used to reduce the noise variance. This alternative would avoid the cost of polarization matching networks for the tracking channels.

Figure 4:
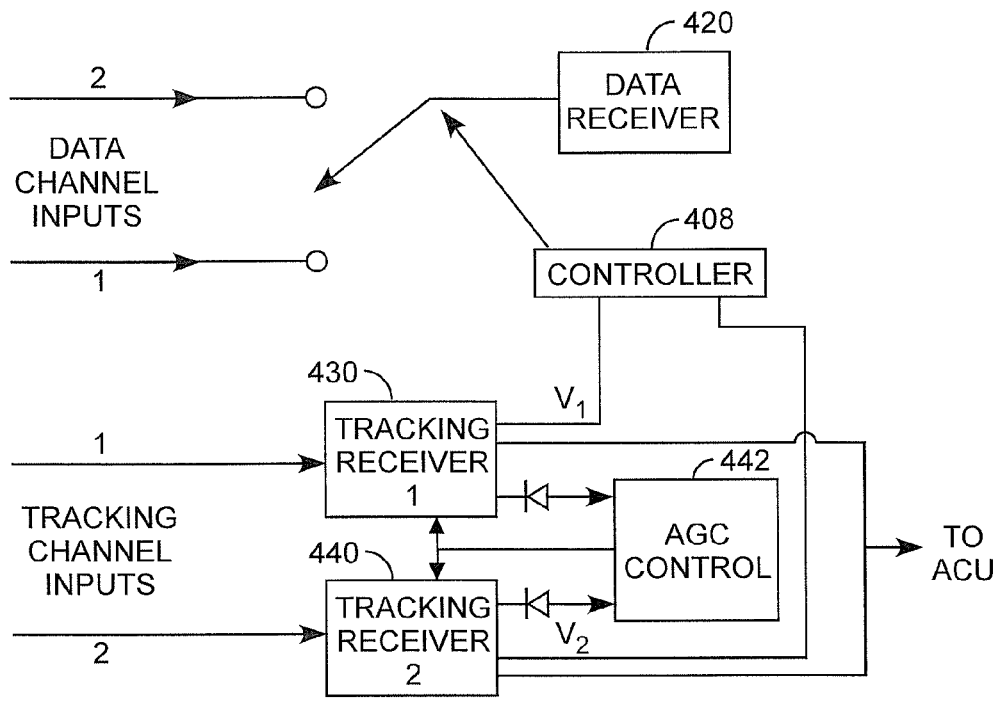
FIG. 4 illustrates antenna system electronics according to another example embodiment of the present invention.

FIG. 4 illustrates antenna system electronics 400 according to an example embodiment of the present invention which are connected to the antenna system 100 (FIG. 1). In this example, the antenna system electronics 400 include a controller 408, a data receiver 420 and tracking receivers 430 and 440, configured as shown. This alternative approach proceeds by examining the tracking channel operation.

The polarization of an incident signal can be resolved into two orthogonal components, $AE_1+BE_2$, wherein A and B have complex values. The response of the tracking receiver to the incident signal, specifically in reference to each of the orthogonal channels, is next considered. For channel 1, the received power is proportional to the complex sum of A times the gain level of the principally polarized response of the tracking channel and B times the gain level of the cross-polarized response of the tracking channel (which is much less than the principally polarized response). For channel 2, the received power is proportional to the complex sum of B times gain level of the principally polarized response of the tracking channel and A times the gain level of the cross polarized response of the tracking channel. If the detected responses of tracking channels 1 and 2 are added together, the dominant polarization component of the incident signal and the principal gain response of the tracking antenna are the preponderate terms in the sum. The unstable cross-polarized tracking signals are suppressed in two ways. The first is the decomposition of the incident signal polarization, and the second is the reduced antenna gain of the tracking channel when a cross-polarized signal is received. As discussed below, it is important to note that the two orthogonal tracking channels are combined after detection. (Any combination at RF would produce another polarization which, in turn, has another polarization that is cross polarized thus resulting in a system that would remain vulnerable to signal loss and unstable antenna tracking.)

The antenna system electronics 400 provide a mechanism for detecting the orthogonally polarized signals employing the two tracking receivers 430 and 440 to receive the tracking channel inputs 1 and 2, respectively. When the outputs of the tracking receivers 430 and 440 are combined, the cross-polarized tracking response is suppressed because the cross-polarized signal component has the lowest level. The combined outputs of the tracking receivers 430 and 440 are routed to the ACU which orients the antenna to track the signal direction by seeking a minimum value corresponding to the null of the tracking pattern. The ACU operates on the response of the principal polarization and the perturbation of the cross polarization response is suppressed and the tracking remains stable.

In an embodiment of the present invention, the tracking receivers 430 and 440 are provided with AGC control circuitry 442 which provides a mechanism for matching tracking amplitude responses of the receivers. If the AGC of each tracking receiver were allowed to function independently, the lower level cross polarized channel would have the same signal output level as the principal polarized channel. By way of example, this problem is avoided by controlling the AGC levels of the two receivers to respond to the total signal power (i.e., combined signal levels of each receiver). In this way, the relative levels of each receiver preserve the difference in the signal levels between the principal and cross polarization, respectively, and the system responds to the desired principal polarization control signal.

The problem of data channel degradation caused by polarization mismatch loss is addressed by the controller 408. In this example embodiment, the controller 408 is configured to receive and process the output signal levels $V_1$ and $V_2$ of the tracking receivers 430 and 440, respectively, and to switch the data channels to the stronger of the two channels.

Figure 5:
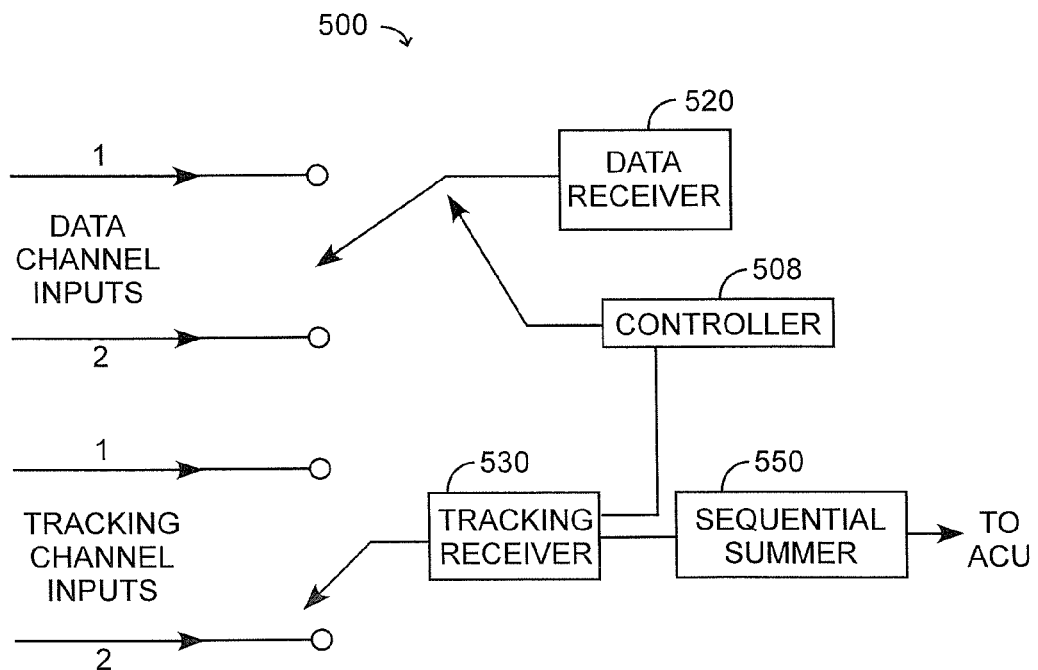
FIG. 5 illustrates antenna system electronics according to yet another example embodiment of the present invention.
Figure 6:
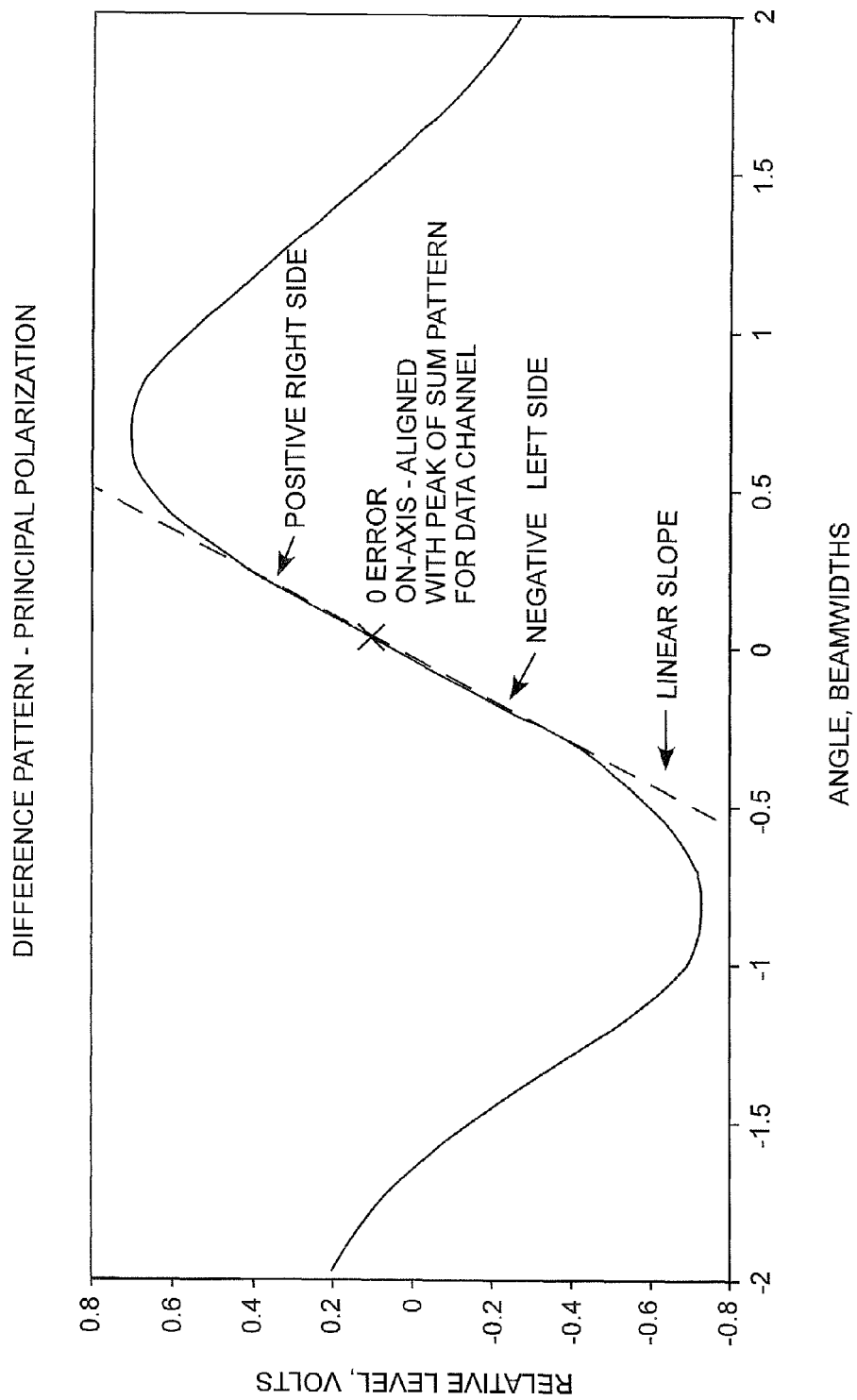
FIG. 6 shows a difference pattern for an example principal polarization response.
Figure 7:
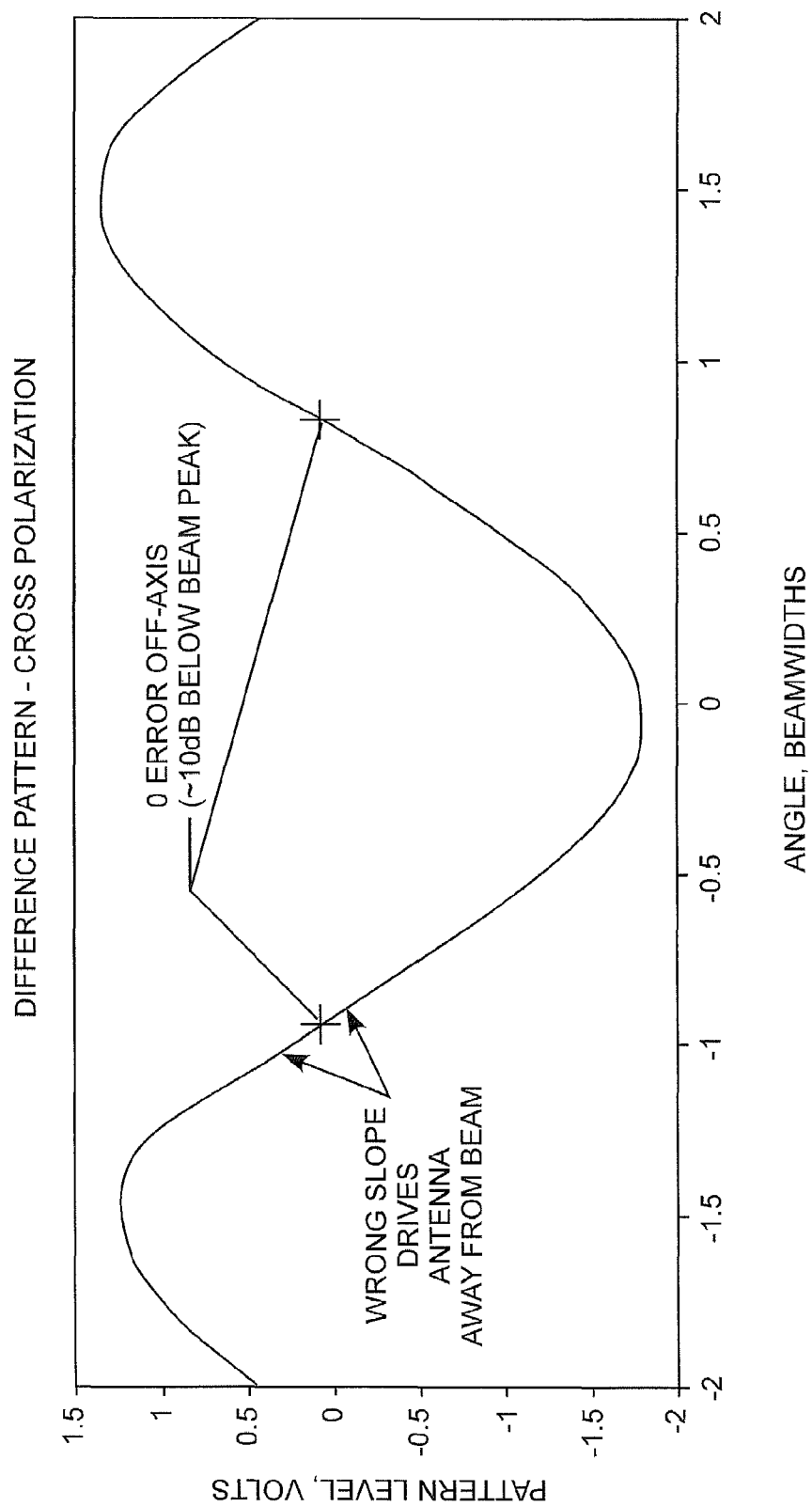
FIG. 7 shows a difference pattern for an example cross polarization response.

FIG. 5 illustrates antenna system electronics 500 according to an example embodiment of the present invention which are connected to the antenna system 100 (FIG. 1). In this example, the antenna system electronics 500 include a controller 508, a data receiver 520, a tracking receiver 530 and a sequential summer 550, configured as shown. In this embodiment, a single tracking receiver is switched between the tracking channel inputs 1 and 2 and the detected outputs are summed together by the sequential summer 550. This embodiment avoids both the expense of a second tracking receiver and the problem of maintaining amplitude alignment of two tracking receivers. However, because the tracking receiver is switched between two orthogonally polarized samples, the tracking sensitivity may be somewhat reduced. Because the received signal is sampled by two independent orthogonally polarized samples, the possibility of a polarization null on one sample results in a polarization peak in the other sample. Thus, the sum of the two detected outputs is weighted by the polarization mismatch loss of the individual orthogonally polarized components, and the tracking response amplitudes are likewise weighted by the polarization mismatch loss in the summed outputs that are routed to the ACU. In this embodiment, which only has one tracking receiver, there is no need to control the AGC levels of two receivers to match their tracking amplitude responses. In this embodiment, the AGC in the tracking receiver 530 can be used to achieve a wide dynamic range.

The problem of data channel degradation caused by polarization mismatch loss is addressed by the controller 508. In this embodiment, the tracking elements for the two respective orthogonal polarizations are sequentially sampled and provided to the controller 508. The controller 508 is configured to receive and process these signals and to switch the data channels to the stronger of the two channels.

Thus, according to an example embodiment of the present invention, a method for antenna tracking includes determining which of two orthogonal polarization components of an incident signal is a stronger signal component, determining a polarization mismatch loss for two orthogonal polarization components, weighing a tracking response amplitude by the polarization mismatch loss, and selecting a polarization of a data channel depending upon the stronger signal component.

According to an example embodiment of the present invention, a system for antenna tracking includes a mechanism for detecting orthogonally polarized signals of a tracking channel, determining which of the orthogonally polarized signals is stronger, and suppressing a cross polarization response of the tracking channel, and a controller configured to select a polarization of a data channel depending upon which of the orthogonally polarized signals is stronger. In various embodiments, the system includes a mechanism for combining the orthogonally polarized signals after the orthogonally polarized signals are detected. An example system includes two tracking receivers configured for detecting the orthogonally polarized signals, respectively, and a mechanism for matching tracking amplitude responses of the two tracking receivers. Another example system includes a single tracking receiver configured to switch between tracking channel inputs for the orthogonally polarized signals and to generate sequential outputs, and a sequential summer configured to receive the sequential outputs and to generate a summed output that is weighed by a polarization mismatch loss of the orthogonally polarized signals.

Although the present invention has been described in terms of the example embodiments above, numerous modifications and/or additions to the above-described embodiments would be readily apparent to one skilled in the art. It is intended that the scope of the present invention extends to all such modifications and/or additions.

We claim:

1. A system for antenna tracking, comprising:
   means for detecting orthogonally polarized signals of a tracking channel, determining which of the orthogonally polarized signals is stronger, suppressing a cross polarization response of the tracking channel, and increasing the accuracy of tracking of incident signal direction to minimize antenna pointing loss; and
   a controller configured to select a polarization of a data channel depending upon which of the orthogonally polarized signals is stronger;
   wherein the tracking channel and the data channel are two different channels;
   wherein the means for detecting orthogonally polarized signals of a tracking channel, determining which of the orthogonally polarized signals is stronger, and suppressing a cross polarization response of the tracking channel includes
   means for combining the orthogonally polarized signals after the orthogonally polarized signals are detected.

2. A system for antenna tracking, comprising:
   means for detecting orthogonally polarized signals of a tracking channel, determining which of the orthogonally polarized signals is stronger, and suppressing a cross polarization response of the tracking channel, and increasing the accuracy of tracking of incident signal direction to minimize antenna pointing loss; and
   a controller configured to select a polarization of a data channel depending upon which of the orthogonally polarized signals is stronger;
   wherein the tracking channel and the data channel are two different channels;
   wherein the means for detecting orthogonally polarized signals of a tracking channel, determining which of the orthogonally polarized signals is stronger, and suppressing a cross polarization response of the tracking channel includes
   two tracking receivers configured for detecting the orthogonally polarized signals, respectively, and
   means for matching tracking amplitude responses of the two tracking receivers.

* * * * *